(12) United States Patent
Zhang

(10) Patent No.: US 10,371,841 B2
(45) Date of Patent: Aug. 6, 2019

(54) DEVICE AND METHOD FOR CALCULATING 3D REVERSE TIME MIGRATION IN TILTED ORTHORHOMBIC MEDIA

(75) Inventor: Yu Zhang, Katy, TX (US)

(73) Assignee: CGG SERVICES SAS, Massy (FR)

( * ) Notice: Subject to any disclaimer, the term of this patent is extended or adjusted under 35 U.S.C. 154(b) by 2169 days.

(21) Appl. No.: 13/442,158

(22) Filed: Apr. 9, 2012

(65) Prior Publication Data

US 2012/0263015 A1 Oct. 18, 2012

Related U.S. Application Data

(60) Provisional application No. 61/474,373, filed on Apr. 12, 2011, provisional application No. 61/474,525, filed on Apr. 12, 2011.

(51) Int. Cl.
*G01V 1/34* (2006.01)
*G01V 1/30* (2006.01)

(52) U.S. Cl.
CPC .......... *G01V 1/30* (2013.01); *G01V 2210/51* (2013.01); *G01V 2210/679* (2013.01)

(58) Field of Classification Search
CPC . G01V 1/30; G01V 2210/51; G01V 2210/679
USPC .......................................................... 367/38
See application file for complete search history.

(56) References Cited

U.S. PATENT DOCUMENTS 5,528,494 A 6/1996 Moses

OTHER PUBLICATIONS

Zhang, et al.; "Reverse Time Migration in Vertical and Tilted Orthorhombic Medic"; SEG Expanded Abstracts 30; Aug. 18-23, 2011; pp. 185-189; San Antonio, TX.
International Property Office Search Report in corresponding Great Britain Application No. 1206416.8 dated Jul. 31, 2012.
Tariq Alkhalifah, "An Acoustic Wave Equation for Anisotropic Media", Geophsics, vol. 65., No. 4, Jul.-Aug. 2000, pp. 1239-1250.
Tariq Alkhalifah, "An Acoustic Wave Equation for Orthorhombic Anisotropy", Geophsics, vol. 68., No. 4, Jul.-Aug. 2003, pp. 1169-1172.
Eric Duveneck, "Stable P-wave Modeling for Reverse-Time Migration in Tilted TI Media", Geophsics, vol. 76., No. 2, Mar.-Apr. 2011, pp. S65-S75.
Michael Schoenberg et al., "Orthorhomic Media: Modeling Elastic Wave Behavior in a Vertically Fractured Earth", Geophsics, vol. 62, No. 6, Nov.-Dec. 1997, pp. P1954-P1974.
Yu Zhang et al., "A Stable TTI Reverse Time Migration and its Implementation", Geophsics, vol. 76., No. 3, May-Jun. 2011, pp. WA3-WA11.

(Continued)

*Primary Examiner* — Daniel L Murphy
(74) *Attorney, Agent, or Firm* — Patent Portfolio Builders PLLC

(57) ABSTRACT

A computing device, computing medium and method for generating an image of a tilted orthorhombic medium. The method includes receiving seismic data related to the tilted orthorhombic medium; calculating a wave propagation with a processing device by applying a second-order equation for reverse time migration to the seismic data to generate a tilted orthorhombic wave propagation; and generating the image of the tilted orthorhombic medium based on the tilted orthorhombic wave propagation.

20 Claims, 4 Drawing Sheets

(56) References Cited

OTHER PUBLICATIONS

J.T. Etgen, "High-order finite-difference reverse time migration with the 2-way non-reflecting wave equation", 1986, Stanford Exploration Project Report, 48, pp. 133-146.
Office Action in corresponding Great Britain Application No. GB1206416.8, dated Aug. 24, 2016.
French Search Report and Written Opinion received in corresponding FR Application 1253369, dated Jun. 20, 2017. All references not cited herewith have been previously made of record.
Houzhu (James) Zhang et al., "Removing S-wave noise in TTI reverse time migration," SEG Houston International Exposition and Annual Meeting, pp. 2849-2853, Sep. 2009.
Robert Wojslaw et al., "Orthorhombic HTI + VTI Wide Azimuth Prestack Time Migrations," SEG Denver Annual Meeting, pp. 292-296, Jan. 2010.
Robin P. Fletcher et al., "Reverse time migration in tilted transversely isotropic (TTI) media," Society of Exploration Geophysicists, Geophysics, vol. 74, No. 6, pp. WCA179-WCA187, Nov.-Dec. 2009.

DEVICE AND METHOD FOR CALCULATING 3D REVERSE TIME MIGRATION IN TILTED ORTHORHOMBIC MEDIA

CROSS REFERENCE TO RELATED APPLICATIONS

This application claims priority and benefit from U.S. Provisional Patent Application No. 61/474,373, filed Apr. 12, 2011, for "Reverse Time Migration in Vertical and Tilted Orthorhombic Media," and Provisional Patent Application No. 61/474,525, filed Apr. 12, 2011, for "Reverse Time Migration in Vertical and Tilted Orthorhombic Media," both authored by H. Zhang, the entire contents of which are incorporated in their entirety herein by reference.

BACKGROUND

Technical Field

Embodiments of the subject matter disclosed herein generally relate to methods and systems for generating high quality Reverse Time Migration (RTM) images of a subsurface and, more particularly, to mechanisms and techniques for generating the RTM images for corresponding tilted orthorhombic media.

Discussion of the Background

Marine seismic data acquisition and processing generate a profile (image) of a geophysical structure under the seafloor. While this profile does not provide an accurate location for the oil and gas, it suggests, to those trained in the field, the presence or absence of oil and/or gas. Thus, providing a high-resolution image of the structures under the seafloor is an ongoing process.

During a seismic gathering process, as shown in FIG. 1, a vessel 10 tows an array of seismic receivers 12 provided on cables 14 that form streamers 16. The streamers may be disposed horizontally, i.e., lying at a constant depth z1 relative to a surface 18 of the ocean. The vessel 10 also tows a sound source assembly 20 that is configured to generate an acoustic wave 22a. The acoustic wave 22a propagates downwards toward the seafloor 24 and penetrates the seafloor until eventually a reflecting structure 26 (reflector R) reflects the acoustic wave. The reflected acoustic wave 22b propagates upwardly until it is detected by receiver 12. the recorded data is then processed for producing an accurate image of the subsurface. the processing may include various phases, e.g., velocity model determination, pre-stack, migration, post-stack, etc., which are known in the art and thus, their description is omitted herein.

A promising processing method is the RTM. The RTM uses a two-way wave equation in depth migration and has shown that in complex subsalt and salt flank areas, it is easier to incorporate amplitude corrections than the traditional methods. In addition to its ability to handle complex velocity distributions, many current RTM algorithms can handle anisotropic media such as vertical transverse isotropy (VTI) and tilted transverse isotropy (TTI).

A medium with orthorhombic symmetry is common in geological environments with fracture systems developed in different directions. For example, two sets of orthogonal vertical fractures produce an orthorhombic medium with two vertical symmetry planes and one horizontal symmetry plane (see, for example, Tsvankin, I., 2001, Seismic signatures and analysis of reflection data in anisotropic media: Elsevier Science Publ. Co., Inc.). Due to certain geological movements in the history, the bedding direction is tilted. In this case, a tilted orthorhombic medium is generated. Thus, the tilted orthorhombic medium is different from VTI or TTI media. It has been shown that in such a system, simple polar anisotropy such as VTI or TTI is not sufficient to describe the seismic wave properties (see Schoenberg, M., and, Helbig, K., "Orthorhombic media: Modeling elastic wave behavior in a vertically fractured earth," Geophysics, 62, 1997, 1954-1974). Thus, there is a need to derive simple acoustic equations to be used for modeling and RTM in vertical and tilted orthorhombic media.

Wave propagation in anisotropic media is naturally handled by the first-order wave equations (see Cerveny, V., Seismic ray theory: Cambridge University Press, 2001). However, the first-order wave equations are computationally intensive and, thus, not so attractive for practical applications. Second-order wave equations appear to cure these deficiencies of the first-order wave equations. Unlike the wave propagation in isotropic media in which P- and S-waves are decoupled, and the propagation of the P-waves is completely governed by one single second-order wave equation, P-waves and S-waves in anisotropic media are coupled and lead to a more complicated system of equations.

Alkhalifah I (Alkhalifah, T., 2000, "An acoustic wave equation for anisotropic media," Geophysics, 65, 1239-1250) introduced a pseudo-acoustic equation in both time and space to model the P-wave propagation in transversely isotropic (TI) medium based on the P-wave dispersion relation. The pseudo-acoustic equation contains fourth-order partial derivatives of the wave-field in time and space, which leads to complexities when numerical implementation is attempted. Alkhalifa II (Alkhalifah, T., 2003, "An acoustic wave equation for orthorhombic anisotropy," Geophysics, 65, 1169-1172), following the same procedure, gave an acoustic wave equation of sixth order for vertical orthorhombic medium. Based on the same dispersion relation as that used in Alkhalifah I, Zhou et al. (Zhou, H., Zhang, G., and Bloor R., 2006, "An anisotropic acoustic wave equation for modeling and migration in 2D TTI media," $76^{th}$ Annual Internat. Mtg., Soc. Expl., Geophys.) obtained a Tilted TI (TTI) system of two coupled second-order partial differential equations which are more convenient to solve numerically.

However, the equations derived in this way may cause numerical instability when applied to real world situations. Several solutions have been proposed to overcome the instability problem. For example, one solution proposed adding non-zero S-wave velocity terms to enhance the stability. Based on a Vertical TI (VTI) system of equations, which is equivalent to its elastic counterpart, Zhang et al. (Zhang, Y., Zhang, H., and Zhang G., 2011, "A stable TTI reverse time migration and its implementation," Geophysics, 76, B1-B9) introduced self-adjoint differential operators in rotated coordinates to stabilize the TTI acoustic wave equations. Others (for example, Duveneck, E. and Bakker, P. M., 2011, "Stable P-wave modeling for reverse-time migration in tilted TI media," Geophysics, 76, S65-S75) derived a stable TTI acoustic system based on Hooke's law and the equation of motion, which are equivalent to their TTI elastic counterpart and provide a theoretically rigorous solution.

However, the above-discussed approaches do not offer a solution for the tilted orthorhombic medium. Accordingly, it would be desirable to provide systems and methods that extend the RTM equations from TTI to tilted orthorhombic medium and are also stable from a numerical point of view and provide high-quality RTM images.

SUMMARY

According to an exemplary embodiment, there is a method for generating an image of a tilted orthorhombic medium. The method includes a step of receiving seismic data related to the tilted orthorhombic medium; a step of propagating wave-fields with a processing device by applying a second-order equation for reverse time migration to the seismic data to obtain tilted orthorhombic wave propagation; and a step of generating the image of the tilted orthorhombic medium based on the tilted orthorhombic wave propagation.

According to another exemplary embodiment, there is a computing device for generating an image of a tilted orthorhombic medium. The computing device includes an interface configured to receive seismic data related to the tilted orthorhombic medium; and a processor connected to the interface. The processor is configured to calculate wave propagation by applying a second-order equation for reverse time migration to the seismic data, and generate the image of the tilted orthorhombic medium based on the wave propagation.

According to still another exemplary embodiment, there is a non-transitory computer readable medium including computer executable instructions, wherein the instructions, when executed by a processor, implement the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
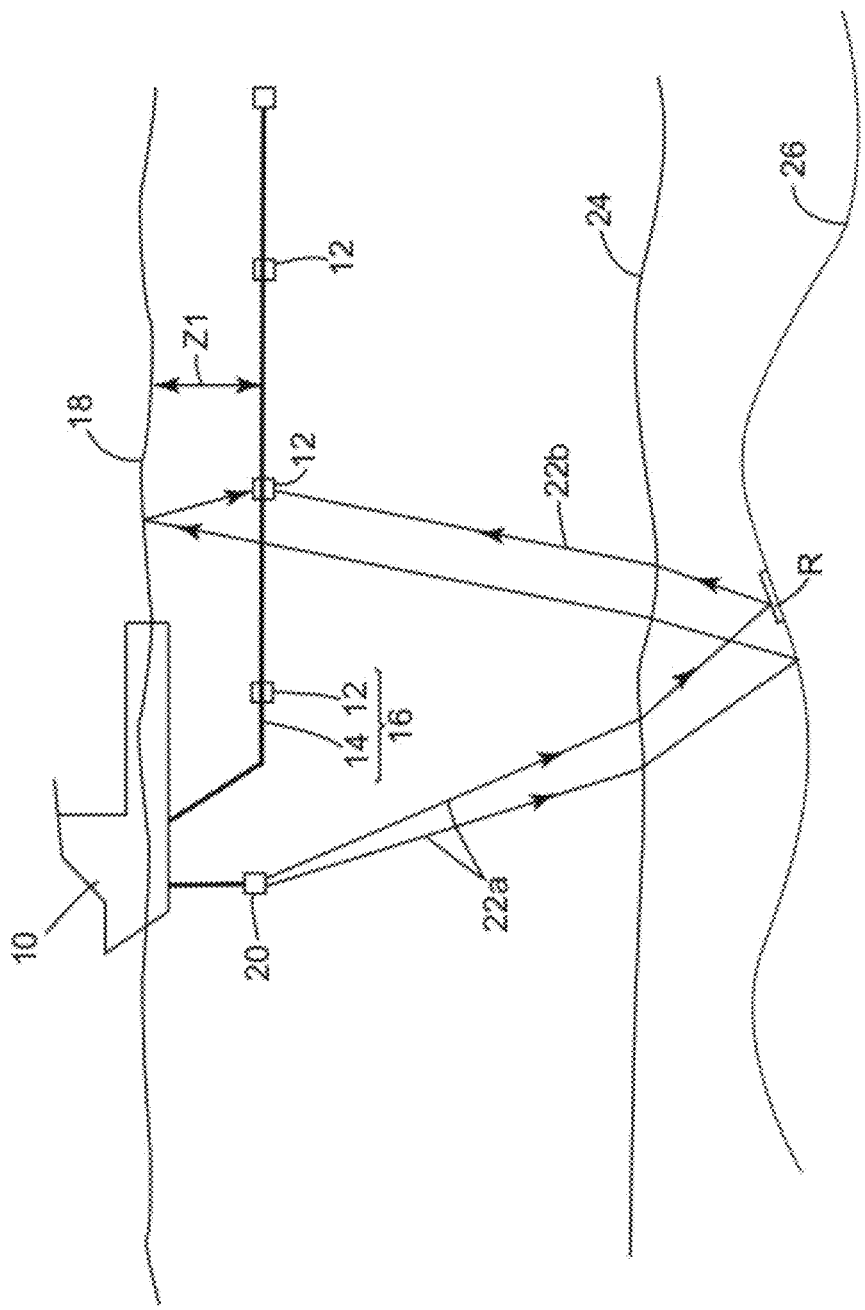
FIG. 1 is a schematic diagram of a conventional data acquisition setup.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to reverse time migration for processing seismic data in a tilted orthorhombic medium. However, the embodiments to be discussed next are not limited to this medium but may be applied to other media.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a stable second-order wave equation is developed for reverse time migration in arbitrarily heterogeneous three-dimensional (3D) orthorhombic media (ORT) with a tilted symmetry axis. The novel formulation is physically stable and is an extension for the wave equations in VTI and TTI media.

According to another exemplary embodiment, reverse time migration impulse responses are calculated for both vertical and tilted orthorhombic media and then, it is shown that the novel formulation provides stable and high quality RTM images in more general anisotropy media. Constraints on the Thomsen's parameters are imposed and they have to be satisfied to ensure physical and numerical stability. Thus, a novel and stable high-order finite-difference algorithm is proposed to solve the system of equations and this algorithm is applied to the RTM. Numerical examples are used to demonstrate that the novel method provides stable and high quality RTM images in more general anisotropy media.

In an exemplary embodiment, a second-order wave equation is first derived in vertical orthorhombic medium. Under the acoustic assumption that $V_{s0}=0$ (i.e., the vertical velocity of the S-waves is zero), the equation of motion and the constitutive relation in orthorhombic medium may be expressed as:

$$\rho \frac{\partial^2 u}{\partial t^2} = G\sigma + f, \qquad (1a)$$

$$\sigma = CGu. \qquad (1b)$$

In equations (1a) and (1b), $\rho$ is the density function, $C=(C_{ij})$ is a 3×3 elastic constant matrix, $u=(u_1, u_2, u_3)^T$ is the particle displacement vector, $\sigma=(\sigma_1,\sigma_2,\sigma_3)^T$ is the vector describing the three principal stresses, and f is the body force vector. In equations (1a) and (1b), the matrix G is defined as:

$$G=\text{diag}(\partial_{x_1},\partial_{x_2},\partial_{x_3}), \qquad (2)$$

where each delta symbol inside the bracket represents a partial derivative and $x_1$, $x_2$ and $x_3$ represent three spatial directions that correspond to a Cartesian system of reference X, Y and Z.

Taking the second derivative with respect to time on both sides of the constitutive relation (1b), considering the motion equation (1a) and setting the density to unity, the following second-order wave equation of the three principal stresses is obtained:

$$\frac{\partial^2 \sigma}{\partial t^2} = CGG\sigma. \quad (3)$$

Equation (3) is a novel second-order wave equation for the stress vector σ in general orthorhombic medium with a vertical symmetry axis.

To facilitate an understanding of equation (3) for seismic imaging, the elastic constants $C_{ij}$ of the elastic matrix C can be represented by the six Thomsen parameters in acoustic case. Thus, the elastic matrix C is given by $C=V^2_{p0}N$, where N is the parameter matrix for vertical orthorhombic medium. N is given by:

$$N = \begin{bmatrix} 1+2\varepsilon_2 & (1+2\varepsilon_2)\sqrt{1+2\delta_3} & \sqrt{1+2\delta_2} \\ (1+2\varepsilon_2)\sqrt{1+2\delta_3} & 1+2\varepsilon_1 & \sqrt{1+2\delta_1} \\ \sqrt{1+2\delta_2} & \sqrt{1+2\delta_1} & 1 \end{bmatrix}, \quad (4)$$

where $\varepsilon_1$, $\varepsilon_2$, $\delta_1$, $\delta_2$ and $\delta_3$ are dimensionless parameters.

The corresponding second-order wave equation in VTI medium can be obtained by setting $\delta_3=0$, $\varepsilon_1=\varepsilon_2$, and $\delta_1=\delta_2$. In this case, the first two rows of N are identical. Therefore, the number of independent wave-field variables is reduced from three to two.

Next, a second-order wave equation for the tilted orthorhombic medium is introduced. In the TTI medium, two angles are needed to transform the elastic tensor from a local system to a global system. For orthorhombic medium, because the physical properties are not symmetrical in the local x-y plane, three angles are needed to describe the above-noted transformation. two angles, (φ,θ), are used to define the vertical axis at each spatial point as for the symmetry axis in the TTI medium. The third angle, β, is introduced to rotate the elastic tensor on the local x-y plane and to represent the orientation of the first crack system for an orthorhombic medium composed of two orthogonal crack systems. After some algebraic manipulations, the following transformation matric $R=(r_{ij})$ is obtained $$\begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} \cos\beta & -\sin\beta & 0 \\ \sin\beta & \cos\beta & 0 \\ 0 & 0 & 1 \end{bmatrix}. \quad (5)$$

The following stable acoustic wave equation in titled orthorhombic medium is obtained after starting from Hooke's law and the equations of motion, applying the acoustic approximation, performing a rotation (as defined by transformation R) into a local Cartesian coordinate system, and making use of the simple form of the elastic stiffness tensor in that coordinate system:

$$\frac{1}{V_{p0}^2}\frac{\partial^2 \sigma'}{\partial t^2} = N\varepsilon', \quad (6)$$

where $\sigma'=(\sigma_1',\sigma_2',\sigma_3')^T$ and $\varepsilon'=(\varepsilon_1',\varepsilon_2',\varepsilon_3')^T$ are the principal stress and strain vector, respectively, defined in the local coordinate system, $V_{p0}$ is the vertical velocity of the P-wave, and $$\begin{cases} \varepsilon_1' = \sum_{k,l=1}^{3} r_{k1}r_{l1}\left\{\sum_{j=1}^{3} \frac{\partial^2}{\partial x_j \partial x_s}(r_{k1}r_{j1}\sigma_1' + r_{k2}r_{j2}\sigma_2' + r_{k3}r_{j3}\sigma_3')\right\} \\ \varepsilon_2' = \sum_{k,l=1}^{3} r_{k2}r_{l2}\left\{\sum_{j=1}^{3} \frac{\partial^2}{\partial x_j \partial x_s}(r_{k1}r_{j1}\sigma_1' + r_{k2}r_{j2}\sigma_2' + r_{k3}r_{j3}\sigma_3')\right\} \\ \varepsilon_3' = \sum_{k,l=1}^{3} r_{k3}r_{l3}\left\{\sum_{j=1}^{3} \frac{\partial^2}{\partial x_j \partial x_s}(r_{k1}r_{j1}\sigma_1' + r_{k2}r_{j2}\sigma_2' + r_{k3}r_{j3}\sigma_3')\right\} \end{cases} \quad (7)$$

Although equation (6) is equivalent to its tilted orthorhombic elastic counterpart, this equation is complicated to implement. Based on self-adjoint differential operators introduced by Zhang et al. in rotated coordinates to stabilize the TTI acoustic wave equation, the following formulation of equation (6) may be achieved in the tilted orthorhombic medium:

$$\frac{1}{V_{p0}^2}\frac{\partial^2 \sigma}{\partial t^2} = ND^T D\sigma, \quad (8)$$

where D is given as a function of the del operator ∇ by:

$$D=\text{diag}(R_1^T\nabla, R_2^T\nabla, R_3^T\nabla). \quad (9)$$

D is the titled first-order derivative and $R_i$ are column vectors of the transformation matrix R introduced in equation (5). It is noted that equation (8) is an energy conservative system. Therefore, equation (8) is stable during wave propagation.

Compared to equation (6), equation (8) is simpler and involves fewer computations. Thus, equation (8) is chosen in the following sections to compute some numerical examples in tilted orthorhombic medium.

To make the system of equations (3) well-posed, the matrix defined in equation (4) is required to be semi-positive. Thus, the following constraints on the Thomsen parameters are introduced:

$$\begin{cases} \varepsilon_1 \geq -\frac{1}{2}, \varepsilon_2 \geq -\frac{1}{2}, \varepsilon_1 \geq \delta_1, \varepsilon_2 \geq \delta_2 \\ (1+2\varepsilon_1) \geq (1+2\varepsilon_2)(1+2\delta_3) \\ \det(N) \geq 0 \end{cases} \quad (10)$$

The acoustic assumption ($V_{s0}=0$) that was considered when introducing the novel formulation of the second-order wave equations reduces the freedom to choose the Thomsen parameters comparative to its elastic counterpart.

Next, a couple of numerical implementation are exemplified for demonstrating some advantages of the new formulation. The second-order wave equation for both the vertical and tilted orthorhombic media can be re-written in the following concise form:

$$\frac{1}{V_{p0}^2}\frac{\partial^2 \sigma}{\partial t^2} = L\sigma, \quad (11)$$

where L is an operator combining the anisotropy parameter matrix N and spatial derivatives of the wave-field and the operator L is different for the tilted and vertical orthorhombic media. Various numerical methods can be used to solve the system (11). One such possibility is a fourth-order temporal finite-difference scheme (see Etgen, J., 1986, "High-order finite-difference reverse time migration with the 2-way non-reflecting wave equation," SEP 48, 133-146). The fourth-order temporal finite-difference scheme may be expressed as:

$$\sigma^{n+1} + 2\sigma^n + \sigma^{n-1} = \hat{V}L\sigma^n + \frac{1}{12}\hat{V}L(\hat{V}L\sigma^n), \tag{12}$$

where $\hat{V} = (V_{p0}\Delta t)^2$.

Operator L in the vertical orthorhombic medium (equation (3)) and in tilted orthorhombic medium (equation (8)) is different, which requires different numerical schemes for solving these equations. In the vertical orthorhombic medium, the differential operators in L are separated second order spatial derivatives and can be efficiently solved using a centered finite-difference scheme.

On the other hand, in the tilted orthorhombic medium, the operator L includes mixed first order derivatives, in which case a staggered-grid scheme would be a conventional choice. However, such a scheme requires interpolating the model parameters onto different computational grids, which may cause accuracy losses. In addition, for higher accuracy, staggered-grid methods usually assume uniform sampling in all three spatial dimensions, which reduces the flexibility of their application and increases the computational cost. To overcome these difficulties, a novel high-order centered finite-difference scheme is introduced to compute the first derivatives in all three spatial directions.

Figures 2A, 2B, 2C:
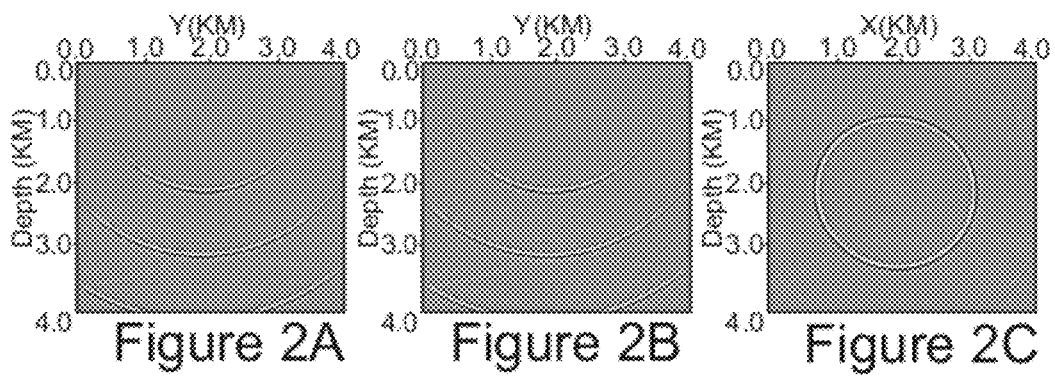
FIGS. 2A, 2B and 2C illustrate RTM impulse responses for a TTI medium in an inline view, cross-line view and dept slices, respectively, according to exemplary embodiments.
Figures 3A, 3B, 3C:
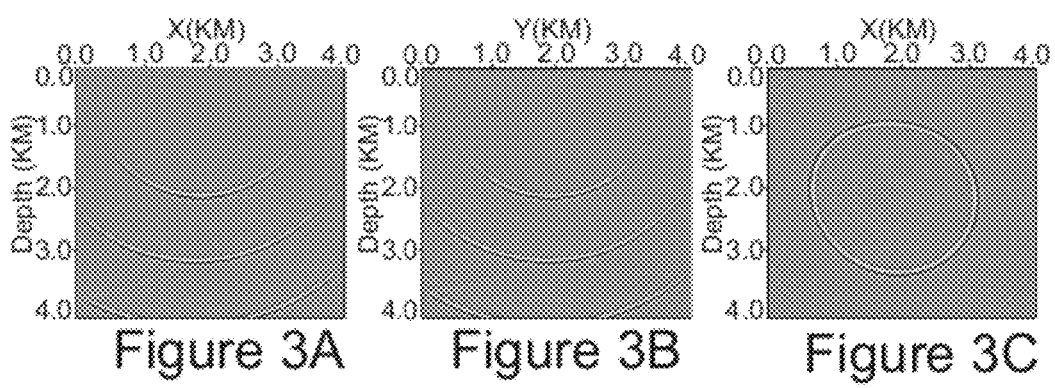
FIGS. 3A, 3B and 3C illustrate RTM impulse responses for a tilted orthorhombic medium in an inline view, cross-line view and dept slices, respectively, according to exemplary embodiments.

For example, RTM impulse responses are computed in both TTI medium and tilted orthorhombic medium. Using synthetic data, RTM impulse responses in TTI medium (calculated based on conventional equations) are illustrated in FIGS. 2A, 2B and 2C, and RTM impulse responses in a tilted orthorhombic medium (calculated based on the novel equations) are illustrated in FIGS. 3A, 3B and 3C. It is noted that FIGS. 2A and 3A shows an inline view, FIGS. 2B and 3B show a cross-line view and FIGS. 2C and 3C shows depth slices. The anisotropic models are homogenous, with $V_{p0}$=2000 m/s, $\varepsilon_1$=0.2, $\varepsilon_2$=0.12, $\delta_1$=0.06, $\delta_2$=0.06 and $\delta_3$=0. The titled axis is defined by $\phi$=35°, $\theta$=40°, and the x-y plane rotation angle $\beta$=25°. In the orthorhombic medium, the anisotropy effects are shown in both x-z and y-z planes (see FIGS. 3A and 3B), which give significant kinematic difference compared to its TTI counterpart (see FIGS. 2A and 2B). The depth slices shown in FIGS. 2C and 3C shows that the Green function from the titled orthorhombic RTM (FIG. 3C) is farther away from being symmetric than that in TTI (see FIG. 2C). This example illustrates that titled orthorhombic is necessary when anisotropy is complicated in the geology.

Another example, illustrated in FIGS. 4A to 5C, show RTM impulse responses for a complex 3D salt model. To simplify the problem, the Thomsen parameters are assumed constant in the sediments, i.e., $\varepsilon_1$=0.18, $\varepsilon_2$=0.13, $\delta_1$=0.09, $\delta_2$=0.06, $\delta_3$=0, $\phi$=35°, $\theta$=25°, and $\beta$=20°, and the model inside the salt body is isotropic.

Figures 4A, 4B, 4C:
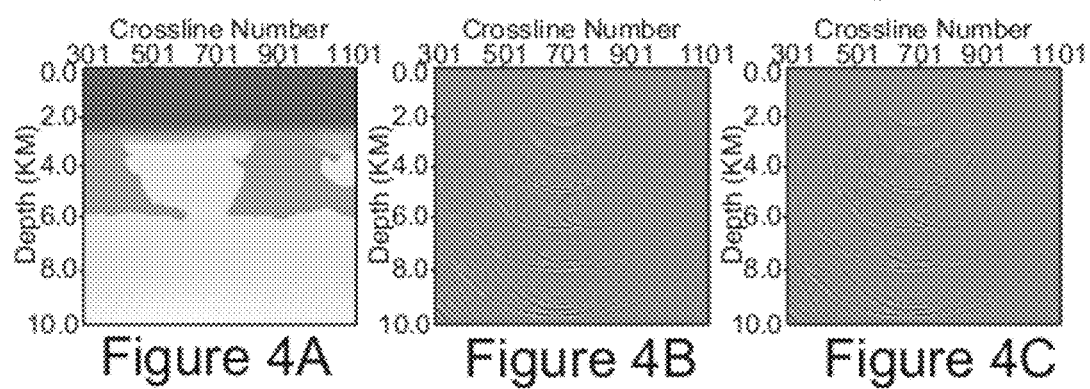
FIGS. 4A and 5A illustrate a velocity model in an inline and cross-line directions, according to exemplary embodiments.
FIGS. 4B and 5B illustrate RTM impulse responses for TTI medium for inline and cross-line directions, respectively, according to exemplary embodiments.
FIGS. 4C and 5C illustrate RTM impulse responses for tilted orthorhombic medium for inline and cross-line directions, respectively, according to exemplary embodiments.
Figures 5A, 5B, 5C:
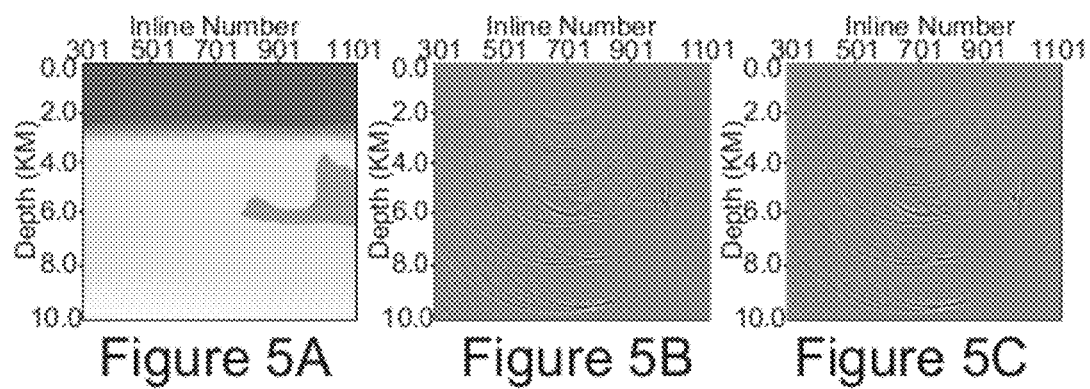

A 3D velocity model is shown in FIGS. 4A and 5A and impulse responses are illustrated in FIGS. 4B, 4C, 5B and 5C. More specifically, for the inline direction, the velocity model is shown in FIG. 4A, the TTI RTM impulse responses are shown in FIG. 4B and the tilted orthorhombic RTM impulse responses are shown in FIG. 4C. For the cross-line direction, the velocity model is shown in FIG. 5A, the TTI RTM impulse responses are shown in FIG. 5B and the tilted orthorhombic RTM impulse responses are shown in FIG. 5C.

Compared to the images in the TTI medium (FIGS. 4B and 5B), the travel distances of the impulse responses in tilted orthorhombic medium (FIGS. 4C and 5C) are larger, especially in the cross-line direction, with steeper dips, although the amplitudes are similar. Thus, the examples discussed above show that the novel titled orthorhombic formulation is stable for imaging complex structures.

To summarize, the novel second-order acoustic wave equation in tilted orthorhombic medium is derived from the first order elastic wave equation. Under the additional constrains on Thomsen parameters, the system is stable and can be numerically solved by a high-order finite difference scheme. Numerical examples show significant differences of wave propagation in polar anisotropy and orthorhombic anisotropy media, especially on the steep propagation angle. Orthorhombic RTM enhances the ability to image structures where fracture systems are developed in different directions.

Figure 6:
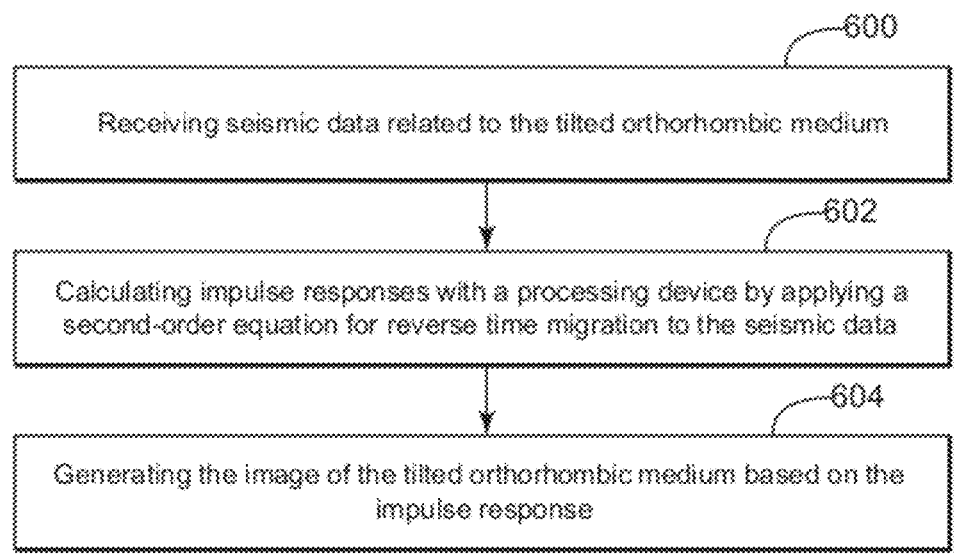
FIG. 6 is a flowchart of a method for calculating an RTM image of a tilted orthorhombic medium according to an exemplary embodiment.

The novel system of equations developed above may be used, according to an exemplary embodiment illustrated in FIG. 6, in a method for generating an image of a tilted orthorhombic medium. The method may include a step 600 of receiving seismic data related to the tilted orthorhombic medium; a step 602 of calculating a wave propagation with a processing device by applying a second-order equation for reverse time migration to the seismic data to obtain a tilted orthorhombic wave propagation; and a step 604 of generating the image of the medium based on the tilted orthorhombic wave propagation.

Figure 7:
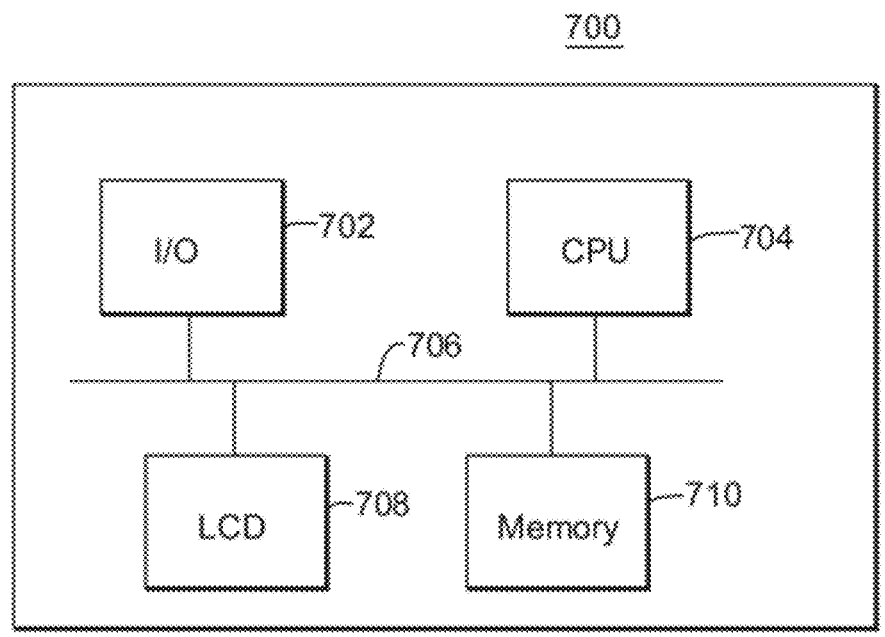
FIG. 7 is a schematic diagram of a processing device for calculating RTM images for tilted orthorhombic medium according to an exemplary embodiment.

The above discussed method may be implemented, in an exemplary embodiment, in a processing apparatus 700 as illustrated in FIG. 7. The processing device 700 may be specifically configured to calculating a final image of a tilted orthorhombic subsurface of the earth. The processing device 700 may be, for example, a computer, a processor, a server, or a network of computers, processors or servers. The processing device 700 may include an interface 702 configured to receive data from outside, e.g., seismic data. The interface 702 may accommodate internet connection, satellite connection, keyboards, etc. The processing device 700 also includes a processor 704 connected through a bus 706 to the interface 702 and configured to execute one or more or all of the steps discussed with regard to FIG. 6. The processing device 700 may have dedicated circuitry for each step of FIG. 6 or the processor 704 may be configured with software to execute all the steps shown in FIG. 6. The processing device 700 may also include a display 708 for displaying a final image calculated by the processor 704. Various data used for calculating the final image may be stored in a storage device 710 that is connected to the processor 704. Other known components of a computer, server or processor may also be present.

The disclosed exemplary embodiments provide a system and a method for more accurately and faster processing data related to a tilted orthorhombic medium. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating an image of a tilted orthorhombic medium, the method comprising:
   receiving seismic data related to the tilted orthorhombic medium;
   propagating wave-fields with a processing device by applying a second-order equation for reverse time migration to the seismic data to obtain tilted orthorhombic wave propagation; and
   generating the image of the tilted orthorhombic medium based on the tilted orthorhombic wave propagation.

2. The method of claim 1, wherein the wave propagations are related to pressure wave-fields.

3. The method of claim 1, wherein the second-order equation includes a tilted first-order derivative D, an anisotropy parameter matrix N and partial time derivatives.

4. The method of claim 3, wherein the first-order derivative D is given by:

$$D = \mathrm{diag}(R_1^T \nabla, R_2^T \nabla, R_3^T \nabla),$$

where $R_i$ are column vectors related to a transformation matrix R and $\nabla$ is a derivative operator.

5. The method of claim 4, wherein the transformation matrix R transforms the stress tensor from a local system to a global system based on three different angles.

6. The method of claim 5, wherein the transformation matrix R is given by:

$$\begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} \cos\beta & -\sin\beta & 0 \\ \sin\beta & \cos\beta & 0 \\ 0 & 0 & 1 \end{bmatrix}$$

where $\theta$ and $\varphi$ define a vertical axis in the tilted orthorhombic medium and $\beta$ describes a rotation of the stress tensor in the local plane.

7. The method of claim 3, wherein the anisotropy parameter matrix N is given by:

$$N = \begin{bmatrix} 1+2\varepsilon_2 & (1+2\varepsilon_2)\sqrt{1+2\delta_3} & \sqrt{1+2\delta_2} \\ (1+2\varepsilon_2)\sqrt{1+2\delta_3} & 1+2\varepsilon_1 & \sqrt{1+2\delta_1} \\ \sqrt{1+2\delta_2} & \sqrt{1+2\delta_1} & 1 \end{bmatrix}$$

where $\varepsilon_1$, $\varepsilon_2$, $\delta_2$ and $\delta_3$ are dimensionless parameters.

8. The method of claim 3, wherein the second-order equation is given by:

$$\frac{1}{V_{p0}^2} \frac{\partial^2 \sigma}{\partial t^2} = ND^T D\sigma,$$

where $V_{p0}^2$ is a p-wave velocity, $\sigma$ is the stress tensor, and $D^T$ is the adjoint of D.

9. A computing device for generating an image of tilted orthorhombic medium, the computing device comprising:
   an interface configured to receive seismic data related to the tilted orthorhombic medium; and
   a processor connected to the interface and configured to,
   calculate wave propagation by applying a second-order equation for reverse time migration to the seismic data, and
   generate the image of the tilted orthorhombic medium based on the wave propagation.

10. The computing device of claim 9, wherein the wave propagation is related to a pressure wave-field.

11. The computing device of claim 9, wherein the second-order equation includes a tilted first-order derivative D, an anisotropy parameter matrix N and partial time derivatives.

12. The computing device of claim 11, wherein the first-order derivative D is given by:

$$D = \mathrm{diag}(R_1^T \nabla, R_2^T \nabla, R_3^T \nabla),$$

where $R_i$ are column vectors related to a transformation matrix R and $\nabla$ is a derivative operator.

13. The computing device of claim 12, wherein the transformation matrix R transforms the stress tensor from a local system to a global system based on three different angles.

14. The computing device of claim 13, wherein the transformation matrix R is given by:

$$\begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} \cos\beta & -\sin\beta & 0 \\ \sin\beta & \cos\beta & 0 \\ 0 & 0 & 1 \end{bmatrix}$$

where $\theta$ and $\varphi$ define a vertical axis in the tilted orthorhombic medium and $\beta$ describes a rotation of the stress tensor in the local plane.

15. The computing device of claim 11, wherein the anisotropy parameter matrix N is given by:

$$N = \begin{bmatrix} 1+2\varepsilon_2 & (1+2\varepsilon_2)\sqrt{1+2\delta_3} & \sqrt{1+2\delta_2} \\ (1+2\varepsilon_2)\sqrt{1+2\delta_3} & 1+2\varepsilon_1 & \sqrt{1+2\delta_1} \\ \sqrt{1+2\delta_2} & \sqrt{1+2\delta_1} & 1 \end{bmatrix}$$

where $\varepsilon_1$, $\varepsilon_2$, $\delta_2$ and $\delta_3$ are dimensionless parameters.

16. The computing device of claim 11, wherein the anisotropy parameter matrix N is given by:

$$\frac{1}{V_{p0}^2} \frac{\partial^2 \sigma}{\partial t^2} = ND^T D\sigma,$$

where $V_{p0}^2$ is a p-wave velocity, $\sigma$ is the stress tensor, and $D^T$ is the adjoint of D.

17. A non-transitory computer readable medium including computer executable instructions, wherein the instructions, when executed by a processor, implement a method for generating an image of a tilted orthorhombic medium, the instructions comprising:
   receiving seismic data related to the tilted orthorhombic medium;
   calculating a wave propagation with a processing device by applying a second-order equation for reverse time migration to the seismic data; and
   generating the image of the tilted orthorhombic medium based on the wave propagation.

18. The medium of claim 17, wherein the second-order equation includes a tilted first-order derivative D, an anisotropy parameter matrix N and partial time derivatives.

19. The medium of claim 18, wherein the first-order derivative D is given by:

$$D = \mathrm{diag}(R_1^T \nabla, R_2^T \nabla, R_3^T \nabla),$$

where $R_i$ are column vectors related to a transformation matrix R and $\nabla$ is a derivative operator.

20. The medium of claim 19, wherein the transformation matrix R transforms the stress tensor from a local system to a global system based on three different angles and it is given by:

$$\begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} \cos\beta & -\sin\beta & 0 \\ \sin\beta & \cos\beta & 0 \\ 0 & 0 & 1 \end{bmatrix}$$

where $\theta$ and $\varphi$ define a vertical axis in the tilted orthorhombic medium and $\beta$ describes a rotation of the stress tensor in the local plane, wherein the anisotropy parameter matrix N is given by:

$$N = \begin{bmatrix} 1+2\varepsilon_2 & (1+2\varepsilon_2)\sqrt{1+2\delta_3} & \sqrt{1+2\delta_2} \\ (1+2\varepsilon_2)\sqrt{1+2\delta_3} & 1+2\varepsilon_1 & \sqrt{1+2\delta_1} \\ \sqrt{1+2\delta_2} & \sqrt{1+2\delta_1} & 1 \end{bmatrix}$$

where $\varepsilon_1, \varepsilon_2, \delta_1, \delta_2$ and $\delta_3$ are dimensionless parameters, and wherein the second-order equation is given by:

$$\frac{1}{V_{p0}^2} \frac{\partial^2 \sigma}{\partial t^2} = N D^T D \sigma,$$

where $V_{p0}^2$ is a p-wave velocity, $\sigma$ is the stress tensor, and $D^T$ is the adjoint of D.

* * * * *